United States Patent [19]

Matsuura et al.

[11] 4,450,243

[45] May 22, 1984

[54] CARRIER FOR OLEFIN POLYMERIZATION CATALYST

[75] Inventors: Kazuo Matsuura, Ota; Nobuyuki Kuroda, Yokohama; Takeichi Shiraishi, Kawasaki; Yutaka Shikatani, Yokohama; Mituji Miyoshi, Fujisawa, all of Japan

[73] Assignee: Nippon Oil Company, Limited, Tokyo, Japan

[21] Appl. No.: 463,078

[22] Filed: Feb. 2, 1983

[30] Foreign Application Priority Data

Feb. 12, 1982 [JP] Japan .................................. 57-19801

[51] Int. Cl.$^3$ .............................. C08F 4/64; C08F 4/68
[52] U.S. Cl. ...................................... 502/131; 502/107; 502/120; 502/132; 502/134; 502/226; 526/121; 526/125
[58] Field of Search ............... 502/107, 120, 132, 134, 502/131, 226

[56] References Cited

U.S. PATENT DOCUMENTS 3,953,414  4/1976  Galli et al. ...................... 502/134 X
3,991,260  11/1976  Matsuura et al. ............... 502/132 X

*Primary Examiner*—Patrick Garvin
*Attorney, Agent, or Firm*—Stevens, Davis, Miller & Mosher

[57] ABSTRACT

Provided is a carrier for an olefin polymerization catalyst which carrier comprises a substance obtained by adding a liquid organic compound not dissolving a magnesium halide into a liquid medium having dissolved therein a substance which contains the magnesium halide as at least one component, the liquid medium further containing an oxide of Group II–IV metal or metals in the Periodic Table, followed by cooling to a temperature not higher than 0° C. and subsequent heat treatment at a temperature in the range of 40° to 200° C.

8 Claims, No Drawings

CARRIER FOR OLEFIN POLYMERIZATION CATALYST

BACKGROUND OF THE INVENTION

The present invention relates to a carrier for an olefin polymerization catalyst. Particularly, it is concerned with a process for preparing a carrier suitable for the preparation of polyolefins comprising spherical particles having a good flow characteristic.

Heretofore, in this technical field there have been known many catalysts comprising an inorganic magnesium solid as carrier such as a magnesium halide, magnesium oxide or magnesium hydroxide and a transition metal compound such as a titanium compound or a vanadium compound supported on the carrier. However, the polymers obtained by using those known catalysts generally comprise particles having a low bulk density, a small average particle size, an amorphous shape and a wide particle size distribution including a large proportion of fine particles. Because of these disadvantages, there has been a keen desire for improvement from the standpoint of productivity and slurry handling. Furthermore, when molding those polymers, there arise problems such as the generation of dust and lowering of the molding efficiency, and consequently it has been strongly desired to increase the bulk density and average particle size and decrease the proportion of fine particles.

SUMMARY OF THE INVENTION

It is an object of the present invention to eliminate the above-mentioned disadvantages of the prior art.

It is another object of the present invention to provide a catalyst carrier very effective in obtaining a polymer comprising spherical particles having a high bulk density, a narrow particle size distribution and an extremely decreased proportion of fine particles and hence having a good flow characteristic.

Other objects and advantages of the present invention will become apparent from the following description.

The above-mentioned objects of the present invention can be attained by a carrier for an olefin polymerization catalyst which carrier comprises a substance obtained by adding a liquid organic compound not dissolving a magnesium halide into a liquid medium having dissolved therein a substance which contains the magnesium halide as at least one component, the liquid medium further containing an oxide of Group II–IV metal or metals in the Periodic Table, followed by cooling to a temperature not higher than 0° C. and subsequent heat treatment at a temperature in the range of 40° to 200° C.

If polymerization or copolymerization of olefins is carried out using a catalyst comprising the combination of a solid catalyst component obtained by supporting a titanium compound and/or a vanadium compound on the so-prepared carrier of the present invention and an organometallic compound, it is possible to greatly increase the polymer yield per solid and that per transition metal to the extent that the step of removing the residual catalyst from the resulting polymer is no longer necessary, and the resulting polymer powder comprises spherical particles having a high bulk density, a narrow particle size distribution and a decreased proportion of fine particles and hence having a good flow characteristic, thus not only facilitating the polymer handling but also permitting the molding operation to be performed with a minimum likelihood of trouble occurrence. Thus, polyolefins can be produced in an extremely advantageous manner.

DESCRIPTION OF THE PREFERRED EMBODIMENTS

In preparing the carrier for olefin polymerization catalyst of the present invention, first a substance containing a magnesium halide as at least one component is dissolved in a liquid organic medium capable of dissolving such substance.

As the liquid organic medium capable of dissolving a substance which contains a magnesium halide as at least one component, there may be used any liquid compound capable of dissolving such substance, including alcohols, esters, ethers, ketones and amines. Preferred examples thereof include alcohols such as methanol, ethanol, isopropanol, butanol, pentanol, hexanol, octanol, benzyl alcohol, 2-methoxy ethanol and 2-ethoxy ethanol; esters such as methyl formate, ethyl formate, methyl acetate, ethyl acetate, butyl acetate, vinyl acetate, methyl acrylate, methyl methacrylate, octyl butyrate, ethyl laurate, octyl laurate, methyl benzoate, ethyl benzoate, octyl para-hydroxybenzoate, dibutyl phthalate, dioctyl phthalate, dimethyl malonate, dimethyl maleate and diethyl maleate; ethers such as dimethyl ether, diethyl ether, diisopropyl ether, dibutyl ether, diamyl ether, tetrahydrofuran, dioxane and anisole; ketones such as acetone, methyl ethyl ketone, methyl isobutyl ketone, ethyl butyl ketone, dihexyl ketone, acetophenone, diphenyl ketone and cyclohexanone; and amines such as diethylamine, triethylamine, tetramethylenediamine, aniline, N,N-dimethylaniline and pyridine.

The substance containing a magnesium halide as at least one component used in the present invention is a magnesium halide, or a reaction product obtained by reaction of a magnesium halide and one or more other compounds, or a mixture thereof.

Examples of the magnesium halide contained in such substance include magnesium fluoride, magnesium chloride, magnesium bromide and magnesium iodide with magnesium chloride being particularly preferred.

As the reaction product obtained by reaction of a magnesium halide and one or more other compounds, there may be used various known magnesium halide-containing carriers, examples of which include the reaction product of a magnesium halide and $Si(OR)_m X_{4-m}$, the reaction product of a magnesium halide and $B(OR)_n X_{3-n}$, the reaction product of a magnesium halide and $Al(OR)_n X_{3-n}$, the reaction product of a magnesium halide and AlOX, the reaction product of a magnesium halide and a compound having Al—O—C bond, the reaction product of a magnesium halide, and aluminum chloride or an aluminum chloride-ether complex, the reaction product of a magnesium halide and phosphorus pentachloride, -trichloride or -oxytrichloride, the reaction product of a magnesium halide and an organic halide such as dichloroethane or trichlorobenzene, the reaction product of a magnesium halide and a titanium oxyhalide, the reaction product of a magnesium halide and $Si(OR)_m X_{4-m}$ and $Al(OR)_n X_{3-n}$, and the reaction product of a magnesium halide and silicon tetrachloride and ROH, in which formulae R is a hydrocarbon radical having 1 to 20 carbon atoms, X is halogen, m is $0 \leq m \leq 4$ and n is $0 < n \leq 3$. Other known magnesium halide-containing carriers are also employable in the present invention.

The operation for dissolving the substance containing a magnesium halide as at least one component may be performed without involving any special limitation on condition; for example, it may be carried out at room temperature or under heating.

In the case of using the reaction product of a magnesium halide and other compound or compounds, these components may be reacted in advance and then dissolved, or may be reacted in the liquid organic medium capable of dissolving the magnesium halide.

There is no special limitation on the time when an oxide of Group II-IV metal or metals in the Periodic Table is to be contained in the liquid organic medium. Such metal oxide may be contained in the liquid organic medium before or during or after dissolving in the same medium the substance containing a magnesium halide as at least one component.

As the oxide of Group II-IV metal or metals in the Periodic Table used in the present invention, there may be used not only oxides of Group II-IV metals alone but also double oxides of those metals, and even mixtures thereof may be used, of course, examples of which include MgO, CaO, ZnO, BaO, $SiO_2$, $SnO_2$, $Al_2O_3$, $MgO.Al_2O_3$, $SiO_2.Al_2O_3$, $MgO.SiO_2$, $MgO.CaO.Al_2O_3$ and $Al_2O_3.CaO$, among which $SiO_2$, $Al_2O_3$, $SiO_2.Al_2O_3$ and $MgO.Al_2O_3$ are particularly preferred.

The amount of the metal oxide contained in the liquid organic medium may range from 0.1 to 500 g., preferably 1 to 100 g. and more preferably 2 to 50 g. per 10 g. of the substance containing a magnesium halide as at least one component. Into the liquid medium thus having dissolved therein the substance which contains a magnesium halide as at least one component and containing the oxide of Group II-IV metal or metals in the Periodic Table, there is added a liquid organic compound not dissolving the magnesium halide. In this case, the concentration of the substance containing the magnesium halide as at least one component in the liquid medium is not specially limited and may range widely, but usually it ranges from 1 to 30%, preferably 5 to 30%, by weight. As the liquid organic compound there may be used any liquid organic compound not dissolving the magnesium halide. Preferred examples thereof include various saturated hydrocarbon compounds such as pentane, hexane, heptane and octane, and their halogenated derivatives.

The liquid organic compound is added at least in an amount required for precipitation of the substance containing a magnesium halide as at least one component. Usually, the liquid organic compound not dissolving the magnesium halide is added in an amount not less than 50 g., for example, 50 to 5,000 g., preferably 500 to 5,000 g., per one liter of the solution containing the said substance. Preferably, the addition of the liquid organic compound is performed under a temperature condition such that the resulting liquid mixture is held at a temperature usually not lower than 20° C. The rate and method of the addition are not specially limited.

As a result of addition of the liquid organic compound, there precipitate solid substances. Then, the liquid mixture containing those precipitated solid substances is cooled to a temperature not higher than 0° C., usually in the range of 0° to −80° C., preferably −10° to −80° C. The cooling rate is not specially limited, nor is limited the holding time at a temperature not higher than 0° C., although it is desirable to hold the liquid mixture at such temperature for over one minute. A long holding time may be adopted, but usually and suitably the holding time ranges for 5 minutes to 24 hours.

The liquid mixture after cooling to a temperature not higher than 0° C. is then subjected to heat treatment at a temperature in the range of 40° to 200° C., preferably 50° to 100° C. The heating time is not specially limited, but it is desirable to perform heating for over one minute, usually 5 minutes to 24 hours and preferably 10 minutes to 10 hours. After the heat treatment, the solvent is removed to obtain the solid carrier of the present invention.

When the solid carrier of the present invention thus obtained was used in the polymerization of olefin as will be described later, the particle properties of the resulting polymer were greatly improved as compared with the use of a solid carrier prepared without going through the cooling treatment, and this was quite unanticipated. Although the reason why the solid carrier is improved in its performance by the cooling treatment is not clear, it is presumed that the precipitated solid substances are physically improved during the cooling treatment.

On the carrier of the present invention thus prepared is supported a titanium compound and/or a vanadium compound, and by combination thereof with an organometallic compound there is obtained a catalyst for polymerization or copolymerization of olefin or olefins.

A titanium compound and/or a vanadium compound may be supported on the carrier of the present invention, for example, by contacting both together under heating in the presence or absence of an inert solvent. Preferably, both are heated to a temperature in the range of 50° to 300° C., preferably 100° to 150° C., in the absence of a solvent. The reaction time is not specially limited, but usually it is over 5 minutes. A long reaction time may be adopted although it is not necessary. For example, the treatment time may range from 5 minutes to 10 hours.

The amount of the titanium compound and/or vanadium compound used in the present invention may be an excess amount, but usually it is 0.001 to 50 times the weight of the magnesium halide. Preferably, an excess titanium compound and/or vanadium compound is removed by washing with a solvent after the mixing and heat treatment. Means for removing unreacted titanium compound and/or vanadium compound after the reaction is not specially limited. Usually, washing is made several times with a solvent inert to a Ziegler catalyst and the washings are allowed to evaporate under reduced pressure to obtain a solid powder.

Most preferably, the amount of the titanium compound and/or vanadium compound to be supported is adjusted so that the amount of titanium and/or vanadium contained in the resulting solid is in the range of 0.5 to 20% by weight; the range of 1 to 10% by weight is particularly desirable for attaining a well-balanced activity per titanium and/or vanadium and that per solid.

As examples of the titanium compound and/or vanadium compound used in the present invention, mention may be made of halides, alkoxy halides, alkoxides and halogenated oxides of titanium and/or vanadium. Suitable titanium compounds are tetravalent and trivalent titanium compounds. As tetravalent titanium compounds are preferred those represented by the general formula $Ti(OR)_nX_{4-n}$ wherein R is an alkyl, aryl or aralkyl group having 1 to 20 carbon atoms, X is halogen and n is $0 \leq n \leq 4$, examples of which include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, and tetraphenoxytitanium. As trivalent titanium compounds, mention may be made of titanium trihalides obtained by reducing titanium tetrahalides such as titanium tetrachloride and titanium tetrabromide with hydrogen, aluminum, titanium, or an organometallic compound of a Group I-III metal in the Periodic Table, as well as trivalent titanium compounds obtained by reducing tetravalent alkoxytitanium halides represented by the general formula $Ti(OR)_m X_{4-m}$ wherein R is an alkyl, aryl or aralkyl group having 1 to 20 carbon atoms, X is halogen and m is $0 < m < 4$, with an organometallic compound of a Group I-III metal in the Periodic Table. Examples of the vanadium compound include tetravalent vanadium compounds such as vanadium tetrachloride, vanadium tetrabromide, vanadium tetraiodide and tetraethoxyvanadium, pentavalent vanadium compounds such as vanadium oxytrichloride, ethoxydichlorovanadyl, triethoxyvanadyl and tributoxyvanadyl, and trivalent vanadium compounds such as vanadium trichloride and vanadium triethoxide.

The organometallic compound used in the present invention may be selected from organometallic compounds of Group I-IV metals in the Periodic Table known as one component of a Ziegler catalyst, among which organoaluminum compounds and organozinc compounds are particularly preferred, for example, organoaluminum compounds represented by the general formulae $R_3Al$, $R_2AlX$, $RAlX_2$, $R_2AlOR$, $RAl(OR)X$ and $R_3Al_2X_3$ wherein R, which may be alike or different, is an alkyl, aryl or aralkyl group having 1 to 20 carbon atoms and X is halogen, and organozinc compounds represented by the general formula $R_2Z_n$ wherein R, which may be alike or different, is an alkyl group having 1 to 20 carbon atoms, such as triethylaluminum, triisopropylaluminum, triisobutylaluminum, tri-sec-butylaluminum, tri-tert-butylaluminum, trihexylaluminum, trioctylaluminum, diethylaluminum chloride, diisopropylaluminum chloride, ethylaluminum sesquichloride, diethylzinc, and mixtures thereof. The amount of the organometallic compound to be used is not specially limited, but usually it may range from 0.1 to 1,000 mols per mol of the titanium compound and/or vanadium compound.

Olefin polymerization using the catalyst of the present invention may be carried out in the form of slurry polymerization, solution polymerization, or vapor phase polymerization. The polymerization reaction is performed in the same way as in the conventional olefin polymerization reaction using a Ziegler catalyst; that is, the reaction is conducted in a substantially oxygen- and water-free condition in the presence or absence of an inert hydrocarbon. Conditions for the olefin polymerization involve temperatures ranging from 20° to 120° C., preferably 50° to 100° C., and pressures ranging from atmospheric pressure to 70 kg/cm², preferably 2 to 60 kg/cm². Adjustment of the molecular weight can be made to some extent by changing polymerization conditions such as the polymerization temperature and the catalyst mol ratio, but the addition of hydrogen into the polymerization system is more effective for this purpose. Of course, using the catalyst of the present invention there can be performed, without causing any trouble, two or more multi-stage polymerization reactions involving different polymerization conditions such as different hydrogen concentrations and different polymerization temperatures.

The process of the present invention is applicable to the polymerization of all olefins that can be polymerized with a Ziegler catalyst. Particularly, it is suitable for the homopolymerization of α-olefins such as ethylene, propylene, butene-1, hexene-1, 4-methylpentene-1 and octene-1 and the copolymerization of ethylene and propylene, ethylene and butene-1 ethylene and hexene-1, ethylene and 4-methylpentene-1, ethylene and octene-1, and propylene and butene-1.

Copolymerization with dienes for the purpose of modification of polyolefins is also preferable. For example, there may be used such diene compounds as butadiene, 1,4-hexadiene, ethylidene norbornene and dicyclopentadiene.

The following examples are given to further illustrate the present invention, but it is to be understood that the invention is not limited thereto.

EXAMPLE 1

(a) Preparation of Solid Carrier 10 g. of a commercially available anhydrous magnesium chloride and 5 g. of aluminum triethoxide were placed in a stainless steel pot having a content volume of 400 ml. and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 15 g. of the reaction product obtained above and 10 g. of SiO₂ calcined at 600° C. (#952, a product of Fuji-Davison), then 350 ml. of tetrahydrofuran was added. After heating for 2 hours at 80° C., 200 ml. of the tetrahydrofuran was distilled off. Then, 500 ml. of hexane was added at 60° C. to allow solid substances to precipitate, and subsequently the liquid mixture containing the precipitates was cooled to −15° C. under stirring. This cooling treatment was continued for 1 hour. The treated mixture was heated to 80° C. under stirring and held at this temperature for 1 hour. After the heat treatment, the supernatant liquid was removed, followed by drying at 100° C. for 2 hours under reduced pressure to obtain a solid carrier.

(b) Preparation of Solid Catalyst Component 2 g. of the above solid carrier and 0.5 ml. of titanium tetrachloride were added into 40 ml. of hexane, and reaction was allowed to take place for 1 hour under reflux of hexane. Then, after removal of the supernatant liquid, the reaction product was washed with hexane repeatedly until titanium tetrachloride was no longer recognized in the washing, to obtain a solid catalyst component containing 40 mg. of titanium per gram thereof.

(c) Polymerization

A stainless steel autoclave was used as a vapor phase polymerization apparatus, and a loop was formed by a blower, a flow controller and a dry cyclone. The temperature of the autoclave was adjusted by passing a warm water through a jacket attached to the autoclave.

Into the autoclave held at 80° C. were fed the above solid catalyst component and triethylaluminum at the rates of 50 mg/hr and 5 mmol/hr, respectively. Further, ethylene, butene-1 and hydrogen were introduced while adjusting to give a butene-1/ethylene ratio (mol ratio) of 0.28 in the vapor phase within the autoclave and a hydrogen concentration of 15% of the total pressure, and polymerization was allowed to take place while maintaining the total pressure at 10 kg/cm$^2$·G by circulating the intra-system gases by means of the blower, to give an ethylene copolymer having a bulk density of 0.41, a melt index (MI) of 0.90 and a density of 0.9208. The catalytic activity was 304,000 g.copolymer/g.Ti and thus very high.

After a continuous run for 10 hours, the autoclave was opened and its interior was checked. As a result, the inner wall and the stirrer proved to be clean without adhesion of polymer.

The polymer particles obtained were spherical particles having a good flow characteristic with an average particle size as large as 910$\mu$, and the proportion of fine particles with a particle size below 200$\mu$ was 0%.

COMPARATIVE EXAMPLE 1

A solid carrier and a solid catalyst component (titanium content: 40 mg/g) were prepared in the same way as in Example 1 except that the cooling treatment was not performed in the preparation of the solid carrier. Then, using the so-prepared solid catalyst component, copolymerization of ethylene and butene-1 was carried out in the same manner as in Example 1 to give a copolymer having a bulk density of 0.38, a melt index of 0.88 and a density of 0.9210. The catalytic activity was 300,000 g.copolymer/g.Ti and thus very high.

The polymer particles obtained were generally spherical particles having a proportion of fine particles below 200$\mu$ of 0.1%, and thus exhibited a good result, but were inferior in comparison with the polymer particles obtained in Example 1.

EXAMPLE 2

The reaction product of 10 g. anhydrous magnesium chloride, 4 g. aluminum triethoxide and 3 g. tetraethoxysilane, and 10 g. of silicon dioxide, were added into 350 ml. of ethyl acetate, and after heating for 1 hour at 100° C., 500 ml. of hexane was added at 60° C. to allow solid substances to precipitate. Subsequently, the liquid mixture was subjected to cooling treatment for 1 hour at −30° C. under stirring and then to heat treatment at 100° C. for 1 hour, then the supernatant liquid was removed, followed by drying at 100° C. for 2 hours under reduced pressure to obtain a solid carrier.

A solid catalyst component (titanium content: 40 mg/g) was prepared in the same way as in Example 1 except that the solid carrier just prepared above was employed, and using the so-prepared solid catalyst component there was performed copolymerization of ethylene and butene-1 in the same manner as in Example 1, to give a copolymer having a bulk density of 0.41, a melt index of 0.92 and a density of 0.9215. The catalytic activity was 305,000 g.copolymer/g.Ti and thus very high.

The polymer particles obtained were spherical particles having a good flow characteristic with an average particle size as large as 850$\mu$, and the proportion of fine particles with a particle size below 200$\mu$ was 0%.

EXAMPLE 3

A solid carrier was prepared in the same way as in Example 1 except that 500 ml. of pentane was used in place of 500 ml. of hexane, and using this solid carrier there was prepared a solid catalyst component (titanium content: 40 mg/g) in the same manner as in Example 1. Then, using the so-prepared solid catalyst component there was performed copolymerization of ethylene and butene-1 in the same way as in Example 1 to give a copolymer having a bulk density of 0.42, a melt index of 0.90 and a density of 0.9208. The catalytic activity was 302,000 g.copolymer/g.Ti and thus very high.

The polymer particles obtained were spherical particles having a good flow characteristic with an average particle size as large as 850$\mu$, and the proportion of fine particles with a particle size below 200$\mu$ was 0%.

EXAMPLE 4

10 g. of anhydrous magnesium chloride and 4 g. of magnesium diethoxide were added into 350 ml. of tetrahydrofuran containing 10 g. of alumina, and after heating at 100° C. for 1 hour, 200 ml. of the tetrahydrofuran was distilled off. Then, 500 ml. of hexane was added at 60° C. to allow solid substances to precipitate. Subsequently, the liquid mixture was subjected to cooling treatment for 1 hour at −15° C. under stirring and then to heat treatment at 100° C. for 1 hour, then the supernatant liquid was removed, followed by drying at 100° C. for 2 hours to obtain a solid carrier.

A solid catalyst component (titanium content: 40 mg/g) was prepared in the same way as in Example 1 except that the solid carrier just prepared above was employed, and using this solid catalyst component there was performed copolymerization of ethylene and butene-1 in the same manner as in Example 1 to afford a copolymer having a bulk density of 0.42, a melt index of 0.87 and a density of 0.9213. The catalytic activity was 236,000 g.copolymer/g.Ti and thus very high.

The polymer particles obtained were spherical particles having a good flow characteristic with an average particle size as large as 810$\mu$, and the proportion of fine particles with a particle size below 200$\mu$ was 0%.

EXAMPLE 5

A solid carrier was prepared in the same way as in Example 2 except that 500 ml. of heptane was used in place of 500 ml. of hexene, and using this solid carrier there was prepared a solid catalyst component (titanium content: 40 mg/g) in the same manner as in Example 1. Then, using the so-prepared solid catalyst component there was performed copolymerization of ethylene and butene-1 in the same way as in Example 1 to afford a copolymer having a bulk density of 0.43, a melt index of 0.89 and a density of 0.9214. The catalytic activity was 285,000 g.copolymer/g.Ti and thus very high.

The polymer particles obtained were spherical particles having a good flow characteristic with an average particle size as large as 950$\mu$, and the proportion of fine particles with a particle size below 200$\mu$ was 0%.

What is claimed is:

1. A carrier for an olefin polymerization catalyst, said carrier comprising a substance obtained by adding a liquid organic compound not dissolving a magnesium halide into a liquid medium having dissolved therein a substance which contains the magnesium halide as at least one component, said liquid medium further containing an oxide of Group II-IV metal or metals in the Periodic Table, followed by cooling to a temperature not higher than 0° C. and subsequent heat treatment at a temperature in the range of 40° to 200° C.

2. The carrier of claim 1, wherein said liquid medium is a liquid organic medium comprising at least one member selected from the group consisting of alcohols, esters, ethers, ketones and amines.

3. The carrier of claim 1, wherein said metal oxide comprises at least one member selected from the group consisting of MgO, CaO, ZnO, BaO, $SiO_2$, $SnO_2$, $Al_2O_3$, $MgO.Al_2O_3$, $SiO_2.Al_2O_3$, $MgO.SiO_2$, $MgO.CaO.Al_2O_3$ and $Al_2O_3.CaO$.

4. The carrier of claim 1, wherein said metal oxide is present in said liquid medium in a ratio of 0.1 to 500 g. per 10 g. of said substance containing the magnesium halide as at least one component.

5. The carrier of claim 1, wherein said liquid organic compound is a saturated hydrocarbon or a halogenated derivative thereof.

6. The carrier of claim 1, wherein the amount of said liquid organic compound added is not less than 50 g. based on one liter of the solution containing the substance which contains the magnesium halide as at least one component.

7. An olefin polymerization catalyst comprising the combination of a titanium compound and/or a vanadium compound supported on the carrier of claim 1 and an organometallic compound.

8. A process for preparing a carrier for an olefin polymerization catalyst, which process comprises adding a liquid organic compound not dissolving a magnesium halide into a liquid medium having dissolved therein a substance which contains the magnesium halide as at least one component, said liquid medium further containing an oxide of Group II-IV metals in the Periodic Table, then cooling the resulting liquid mixture to a temperature not higher than 0° C. and thereafter subjecting the cooled mixture to heat treatment at a temperature in the range of 40° to 200° C.

* * * * *